United States Patent [19]

Owens et al.

[11] Patent Number: 5,319,018

[45] Date of Patent: Jun. 7, 1994

[54] TRANSITION METAL CROSSLINKING OF ACID-CONTAINING POLYMERS

[75] Inventors: Joseph M. Owens, Hatboro; Richard T. Gray, Levittown, both of Pa.

[73] Assignee: Rohm and Haas Company, Philadelphia, Pa.

[21] Appl. No.: 901,456

[22] Filed: Jun. 19, 1992

Related U.S. Application Data

[62] Division of Ser. No. 690,375, Apr. 23, 1991, Pat. No. 5,149,745.

[51] Int. Cl.⁵ .............................................. C08F 8/42
[52] U.S. Cl. ................................... 524/556; 524/560; 525/330.2; 525/370; 525/371; 525/372; 525/373
[58] Field of Search ............................... 524/556, 560

[56] References Cited

U.S. PATENT DOCUMENTS

| | | | |
|---|---|---|---|
| 4,090,013 | 5/1978 | Ganslaw et al. | 525/330.2 |
| 4,517,330 | 5/1985 | Zdanowski et al. | 525/330.2 |
| 4,690,981 | 9/1987 | Statz | 525/330.2 |
| 4,716,202 | 12/1987 | Strauss | 525/330.2 |
| 4,771,105 | 9/1988 | Suirai et al. | 525/330.2 |
| 4,826,907 | 5/1989 | Murao et al. | 524/399 |

Primary Examiner—Bernard Lipman
Attorney, Agent, or Firm—Wendy A. Taylor

[57] ABSTRACT

Acid-functional polymer is reacted with a transition metal compound at a temperature above the $T_g$ of the polymer to produce crosslinked polymer. The process produces a liquid polymer product that dries to a crosslinked film without the required presence of volatile ligands. Improved coating such as floor polishes are also disclosed.

7 Claims, No Drawings

TRANSITION METAL CROSSLINKING OF ACID-CONTAINING POLYMERS

This is a divisional Ser. No. 690,375, filed Apr. 23, 1991, now U.S. Pat. No. 5,149,745

BACKGROUND OF THE INVENTION

It has been known in the art to add stable complex salts of transition metals such as zinc to emulsions and dispersions of acid containing polymers, (U.S. Pat. Nos. 3,308,078, 3,328,325, 3,467,610, 3,554,790, 4,150,005, and 4,517,330, ).

In practicing this chemistry, complex salts are formed from simple salt or oxides of transition metals with amines or other simple complexing ligands. (In the following formulae 'M' indicates a transition metal, 'L' indicates a ligand).

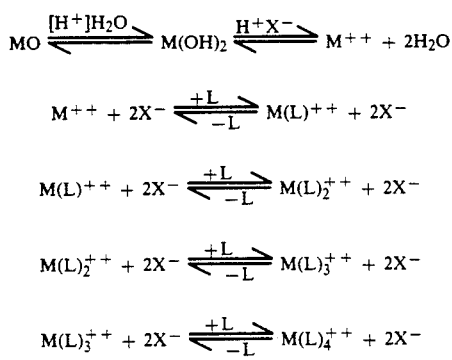

Since each of the above steps in the formation of the complex from the free (or hydrated) metal ion is reversible and runs to equilibrium, the process must be forced to completion (tetradentate ligand complex) by mass action, charging an excess of the ligand species. The complexing agent must be a simple ligand, to avoid the formation of very stable complex structures that will not donate metals to the acidic polymer.

The metal complex is formed before addition to the polymer to increase the ion complex surface area, decreasing the charge per unit area, so that the acid containing polymer is stable in the presence of the multivalent ion. The instability of acid containing polymers to multivalent ions is well known and, in fact, they be are commonly used to flocculate and precipitate polymers from waste streams ($Fe^{++}$, $Fe^{+++}$ and $Al^{+++}$ salts are most commonly used). The reduced charge density of the complex multivalent salt provides only minimal disruption of the polar double layer thought to be responsible for polymer emulsion stability.

When the complex salt solution is added to the acidic emulsion polymer, the salt undergoes counterion exchange. Most commonly, the complex multivalent cations are prepared as carbonate, bicarbonate, or acetate salts. As this technology is generally understood, the only limitation of the anion of the salt is that it be a stronger base than the anion of the pendant polymeric acid. If weaker base anions, such as chloride, etc., are used as the salt, crosslinking apparently does not occur because the process of counterion exchange does not happen; the weaker base anions do not displace the anion of the polymeric acid. (In the following formulae $P\sim CO_2H$ represents an acid functional group attached to a polymer).

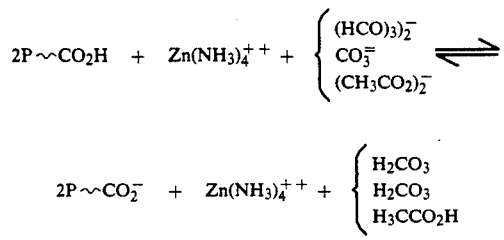

The conjugate acid of the anion of the stable metal complex must be either volatile or unstable. For instance, acetic acid, the conjugate acid of acetate anion, is volatile, and carbonic acid, the conjugate acid of both bicarbonate and carbonate anions, is unstable (spontaneously decomposing to carbon dioxide and water). In practice, the evolution of volatile conjugate acid, or the volatile by-products of the decomposition of the unstable conjugate acid is a processing problem encountered during this crosslinking reaction.

The complex cation, in close association with polymer carboxylate anions provides latent crosslinking of the polymer (*Maintenance Chemical Specialties*, by Walter J. Hackett. Chemical Publishing Co., Inc. N.Y., 1972. pp9-13.). This crosslinking has been referred to as latent because it occurs only after the volatile (amine) ligand is released from the metal during the polymer film formation stages.

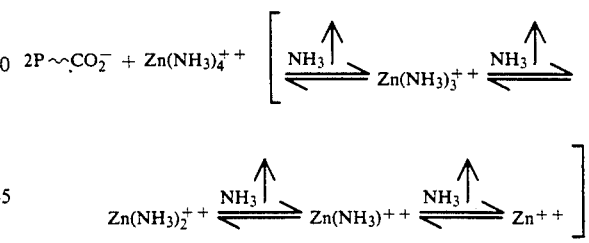

The latent crosslinking may be due to the formation of insoluble metal-polymeric carboxylate salts, or the formation of polymeric carboxyl complexes with the metals.

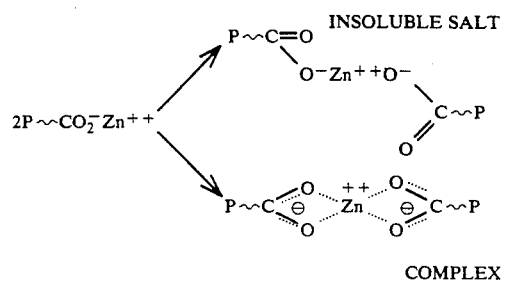

Complexed transition metal salt latent crosslinking has thus enabled the art to produce polymers that will crosslink in a coating upon drying, without interfering with the film formation process. Since the final crosslinked polymer effectively has the pendant acid functionality tied up in insoluble acid-metal salts or complexes, metal crosslinked polymers have improved resistance to alkaline materials, such as detergents or cleaning solutions.

The addition of low levels (typically 1 to 3%) of ammonia or other amine to a cleaner solution is believed to effectively reverse the crosslinking process. The free metal-amine complex is re-formed, thus freeing the polymeric acid functionality which may then be attacked by simple alkaline materials. These amine-containing cleaner solutions are known as strippers, since they effectively allow for the removal of the previously crosslinked films.

One problem of this chemistry has been that application of multiple coats of compositions containing these metal salt complexes can sometimes prove difficult because the new wet coat of polymer composition contains a high concentration of the complexing amine liqand. This high concentration of free amine, and the amine ligand released from the complex, act as a stripper on the previously applied under-coat causing redispersion of the under-coat, drag in the application of the top coat, whitening and ghosting of the coating, and general disruption of the recoating process known as poor recoatability. These difficulties are particularly noted when coating formulations are applied rapidly, as is common practice in industrial applications.

Though transition metal salt latent crosslinking of acid-containing emulsion polymers has provided many improvements in dry film properties, the high ammonia content of transition metal complex formulations is disadvantageous in that it is mildly toxic and highly odoriferous. The volatile ligands lead to difficulties in handling, formulating, and use of the emulsion polymers produced by this technology.

OBJECTS OF THE INVENTION

An object of the invention is to provide a composition that produces a film that exhibits a balance of detergent resistance and removability.

Another object is to provide such a composition that does not generate an objectionable odor, such as that of ammonia, on drying.

A further object is to provide a composition that can be rapidly recoated without degrading earlier applied coats of the composition.

SUMMARY OF THE INVENTION

An acid-functional polymer is reacted with a transition metal compound at a temperature above the glass transition temperature ($T_g$) of the polymer. The transition metal compound is maintained in contact with the polymer for a time sufficient to allow the reaction to occur.

The films produced from the polymer compositions produced according to the invention exhibit the advantages of the crosslinked, detergent resistant films produced through latent metal salt crosslinking without the toxicity, odor, or application problems associated with the use of volatile ligands, such as amines, that have previously been employed in crosslinking acid-containing polymers. Moreover, the process of the invention appears to produce a more complete crosslinking of the acid functionality of the polymer than latent metal salt crosslinking as indicated by the ability to produce higher stoichiometric levels of reaction with the acid functionality of the polymer when practicing the invention.

DETAILED DESCRIPTION OF THE INVENTION

I. POLYMERS

Polymeric materials must meet two criteria to be useful in this invention. They must be dissolved or dispersed in water and must contain pendant acid functionality. Polymers that contain acid functionality only as termini or end groups do not produce the desired crosslinked polymer and film properties.

The acid functionality may be incorporated in the polymer by known means using an effective amount, preferably from 4 to 90% by weight of the total monomers of acidic monomers. Examples of acidic monomers are ethylenically unsaturated acid monomers, such as acrylic acid, methacrylic acid, maleic acid, itaconic acid, maleic anhydride, vinyl phenol and mixtures thereof.

Other monomers in the polymer preparation are selected to produce the desired end use and application properties sought and include the polymerizable comonomers which form soft polymers in the presence of free radical catalysts and those that produce hard polymers in the presence of free radical catalysts. Examples of comonomers which polymerize to form soft polymers include primary and secondary alkyl acrylate, with alkyl substituents up to eighteen or more carbon atoms, primary or secondary alkyl methacrylates with alkyl substituents of five to eighteen or more carbon atoms, or other ethylenically-unsaturated compounds which are polymerizable with free radical catalysts to form soft solid polymers, including vinyl esters of saturated monocarboxylic acids of more than two carbon atoms. The preferred ethylenically unsaturated compounds are the stated acrylates, itaconates, and methacrylates, and of these the most preferred esters are those with alkyl groups of not more than 8 carbon atoms.

The preferred monomers which by themselves yield soft polymers may be summarized by the formula

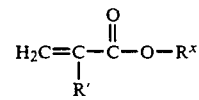

wherein R' is hydrogen or a methyl group and, when R' is methyl $R^x$ represents a primary or secondary alkyl group of 5 to 18 carbon atoms, and when R' is hydrogen, $R^x$ represents an alkyl group of not over 18 carbon atoms, preferably of 2 to 8 carbon atoms and more preferably 2 to 4 carbon atoms.

Typical compounds coming within the above definition are ethyl acrylate, proply acrylate, isoproply acrylate, butyl acrylate, isobutyl acrylate, sec-butyl acrylate, amyl acrylate, isoamyl acrylate, hexyl acrylate, 2-ethylhexyl acrylate, octyl acrylate, 3,5,5-trimethylhexylacrylate, decyl acrylate, dodecyl acrylate, cetyl acrylate, octadecyl acrylate, octadecenyl acrylate, n-amyl methacrylate, sec-amyl methacrylate, hexyl methacrylate, 2-ethylhexyl methacrylate, 2-ethylbutyl methacrylate, octyl methacrylate, 3,5,5-trimethylhexyl methacrylate, decyl methacrylate, dodecyl methacrylate, octadecyl methacrylate, and those with substituted alkyl groups such as butoxylethyl acrylate or methacrylate.

Another group of monomers which by themselves yield soft polymers are butadiene, chloroprene, isobutene, and isoprene. These are monomers commonly used in rubber latices along with a hard monomer also useful in this invention, such as acrylonitrile, styrene, and other hard monomers as given above. The olefin monomers, particularly ethylene and propylene, are also suitable soft monomers.

Examples of polymerizable ethylenically unsaturated monomers which by themselves form hard polymers, are alkyl methacrylates having alkyl groups of not more than four carbon atoms and alkyl acrylates having alkyl groups of not more than 2 carbon atoms also tert-amyl methacrylate, ter-butyl or tert-amyl acrylate, cyclohexyl, benzyl or isobornyl acrylate or methacrylate, acrylonitrile, or methacrylonitrile, these constituting a preferred group of the compounds forming hard polymers. Styrene, vinyl chloride, chloride, chlorostyrene, vinyl acetate and a-methylstyrene, which also form hard polymers, may be used.

Preferred monomers, which by themselves form hard polymers, may be summarized by the formula

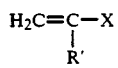

wherein R' is hydrogen or a methyl group and wherein X represents one of the groups —CN, phenyl, methylphenyl, and ester-forming groups, —COOR", wherein R" is cyclohexyl or methyl or a tert-alkyl group of four to five carbon atoms, or, when R' is methyl, an alkyl group of two to four carbon atoms. Some typical examples of these have already been named. Other specific compounds are methyl methacrylate, ethyl methacrylate, propyl methacrylate, isoproply methacrylate, isobutyl methacrylate, n-butyl methacrylate, sec-butyl methacrylate, and tert-butyl methacrylate. Acrylamide and methacrylamide may also be used as hardening components of the copolymer.

A further class of polymers of this invention are polymers of the esters of vinyl alcohol such as vinyl formate, vinyl acetate, vinyl propionate, vinyl butyrate and vinyl versitate. Preferred is poly(vinyl acetate) and copolymers of vinyl acetate with one or more of the following monomers: vinyl chloride, vinylidene chloride, styrene, vinyl toluene, acrylonitrile, methacrylonitrile, acrylate or methacrylate esters, and the functional group containing monomers given above.

These polymers can be prepared, for example by emulsion copolymerization of the several monomers in the proper proportions. Conventional emulsion polymerization techniques are described in U.S. Pat. Nos. 2,754,280 and 2,795,564. Thus the monomers may be emulsified with an anionic, a cationic, or a nonionic dispersing agent, about 0.5% to 10% thereof being used on the weight of total monomers. When water-soluble monomers are used, the dispersing agent serves to emulsify the other, less soluble monomers. A polymerization initiator of the free radical type, such as ammonium or potassium persulfate, may be used alone or in conjunction with an accelerator, such as potassium metabisulfite, or sodium thiosulfate. The initiator and accelerator, commonly referred to as catalyst, may be used in proportions of ½ to 2% each based on the weight of monomers to be copolymerized. The polymerization temperature may be from room temperature to 90° C. or more as is conventional.

Examples of emulsifiers or soaps suited to this polymerization process include alkali metal and ammonium salts of alkyl, aryl, alkaryl, and aralkyl sulfonates, sulfates, and polyether sulfates; the corresponding phosphates and phosphonates; and ethoxylated fatty acids, alcohols, amines, amides, and alkyl phenols.

Chain transfer agents, including mercaptans, polymercaptans, and polyhalogen compounds, are often desirable in the polymerization mix.

Staged or sequential copolymers can also be crosslinked according to the invention. Particularly useful first stage copolymers are ethylene/ethylacrylate copolymers and ethylene/vinyl acetate copolymers containing added hydrophilic monomer.

Unless otherwise indicated, "$T_g$" indicates the calculated glass transition temperature according to the method of T.G. Fox, Bull. Am. Phys. Soc. 1 (3), 123 (1956).

Metals

All of the transition metals are capable of forming polymeric crosslinks, though care must be exercised when considering the use of arsenic, mercury, cobalt, copper, lead, cadmium, nickel and chromium for a specific application due to high cost, toxicity, or the production of a color in the polymeric film. Certain transition metals such as aluminum, tungsten, and tin that could not be used in latent metal salt crosslinking because of their inability to form a stable amine complex, are useful in the present invention. Combinations of transition metals may be effectively used. The divalent alkaline metals are generally not effective as crosslinking agents.

The preferred metals, based on criteria of low cost, low toxicity, and low color in the crosslinked film, include zinc, aluminum, tin, tungsten and zirconium. Zinc and aluminum are particularly preferred. Useful compounds of the transition metals include the oxide, hydroxide, carbonate and acetate (usually the basic acetate due to the solubility concern discussed below).

When used in emulsion or dispersions of acid-containing polymer, the metal compounds must be relatively insoluble since even moderately soluble salts (i.e. $\geq 0.4\%$ in water at 60° C.) can produce excessively high levels of multivalent cations in solution. High levels of multivalent cations can cause dispersions or emulsions of acid-containing polymer to precipitate or sediment from the dispersion or emulsion because of the polymer's multivalent cation instability (the double layer is believed to be disrupted by multivalent cations). This requirement for a low solubility transition metal compound does not apply to acid-containing polymers in aqueous solution, but only to aqueous dispersions and emulsions of acid-containing polymers.

REACTION WITH TRANSITION METAL COMPOUND

In one embodiment, the process of the invention is practiced by charging a reaction zone with an acid-containing polymer in dispersion or solution, and charging to this, while the polymer is maintained at a temperature above its effective glass transition temperature (Tg), an appropriate amount of transition metal compound. The compound is maintained in contact with the acid-containing polymer, at the elevated temperature, until the reaction is completed. The point of completion of the reaction is indicated by an observable reduction in opacity and an increase in the pH of the reaction mixture. The process can also be practiced by heating the polymer dispersion after the insoluble metal compound has been added. The reaction zone can be any suitable reaction vessel or area in a reactor. The transfer of materials from one vessel or portion of a reactor, if performed during the reaction, will bring the additional vessel or area under the team reaction zone. The process may be practiced as a batch, continuous or semi-continuous process.

The maximum amount of transition metal compound for use in dispersion or emulsion system can be determined by reference to the amount (equivalence) of pendant acid functionally in the polymer and then selecting the desired amount of metal based on the known valence of the metal ion. Divalent metal ions will stoichiometrically react with two equivalents of acid per mole of metal salt, and trivalent metal ions will react with three equivalents of acid. Monovalent metal salts will not effectively crosslink the polymer by this technique.

It is generally desireable to use less than a full stoichiometric equivalent of the metal to reduce the chance of accidentally charging more of the metal than the reaction will consume. The presence of an unreacted excess could decrease the emulsion stability or produce a residue of metal compound in the resulting film which is undesired in some uses of the reaction product.

If the metal compound is added in finely divided form the reaction will proceed more rapidly. Pre-dispersing the finely divided metal compound will produce an even more rapid reaction. Generally the extent or effectiveness of the reaction is not changed by these modifications, only the speed of the reaction. If the acid-containing polymer is prepared as an aqueous solution polymer with moderate to low solubility it is necessary that the insoluble metal compound be added as a very fine powder or aqueous dispersion. Failure to follow this caveat with low solubility aqueous solution polymers can result in the particles of metal compound being coated with a layer of insoluble polymeric metal salt which will effectively retard further reaction of the polymer with the transition metal compound.

Water insoluble acid-containing polymer dispersions must be maintained in the acid form before addition of the insoluble metal compound. Partial neutralization of the polymer (2-20%) may be carried out to impart polymer emulsion stability or polymer solubility, but more extensive neutralization (for example ≧50%) retards the speed of the reaction of polymer with metal compound.

Water soluble acid-containing polymers must be neutralized to an extent sufficient to maintain their water solubility during reaction with the metal compounds. Polymers of low solubility will require a higher degree of neutralization to maintain solubility during the reaction, and those of higher solubility will require a lesser degree of neutralization. However, the higher the degree of neutralization of the polymeric acid functionality, the slower will be the reaction with the transition metal compound.

In some uses of the polymer product of the invention, such as floor polish vehicles, it is necessary that the polymer emulsion have a pH greater than 7.0 so that it will allow other formulation ingredients, such as anionic fluorocarbon surfactant wetting agents, to function in their intended manner. It is preferred that this pH adjustment be made after the polymer emulsion has been reacted with the insoluble metal compound so that the majority of the polymeric acid functionality remains in the acid form and the rate of the reaction is not significantly slowed. In some applications of emulsion polymer product it is desirable to neutralize the polymer or formulation with a volatile base, such as ammonia or other amine. It is preferred that any such basification be carried out after the polymer has been reacted with the insoluble transition metal compound. The invention can provide more highly crosslinked polymers and formulations which are stabilized by neutralization with base but exhibit a much lower pH than is possible with amine-complex crosslinking. The mixed metal crosslinking technology disclosed in U.S. Pat. No. 4,517,330 may be practiced along with the process of the invention. It is most desirable to practice this technology by adding the basic alkali metal salt after the polymer has been reacted with the transition metal compound, in order to provide acceptible reaction rates. A fraction of the basic alkaline metal salt may be used to prebasify a small percentage of the polymeric acid functionality to provide enhanced polymer stability during the reaction, as has been described above.

The polymer products of the invention are suitable for any uses in which a polymer having a $T_g$ above room temperature are useful and are particularly suited to uses that must exhibit resistance to chemical or physical challenges. These uses include coatings such as paints, polishes, particularly floor polishes, industrial and maintenance coatings.

The following examples are provided to further illustrate the practice of aspects of the invention. These examples should not be read as limiting the scope of the invention which is described in the specification and claims. Unless otherwise stated parts are parts by weight and percentages are percentages by weight.

POLYMER PREPARATION

Monomer mixture preparation

An emulsified monomer mixture is prepared by slowly adding the following monomers in sequence to a stirred solution of 77 grams of a 28% solution of sodium lauryl sulfate (SLS) in 2600 grams of deionized water:

| monomer | weight (grams) | (percent by weight of total monomer) |
|---|---|---|
| butyl acrylate (BA) | 1981 | (28%) |
| methyl methacrylate (MMA) | 4387 | (62%) |
| methacrylic acid (MAA) | 707 | (10%) |

Procedure A

In a suitable reaction vessel equipped with a thermometer, condensor, and stirrer, a solution of 176 grams of 28% SLS solution and 5150 grams deionized water is heated to 80°-85° C. A 164 gram portion of the monomer emulsion described above is added all at once to the reaction vessel and the temperature adjusted to 80°-82° C. The kettle charge ammonium persulfate (APS) catalyst solution (41.5 grams dissolved in 200 grams water) is added all at one. Within above five minutes the onset of polymerization is signalled by a temperature rise of 3°-5° C. and a change in the appearance (color and opacity) of the reaction mixture. When the exotherm has ceased, the remaining monomer mixture and the cofeed catalyst solution (20.7 grams APS in 600 grams deionized water) are gradually added to the reaction vessel. The rate of addition must be chosen based on the rate at which the heat of the polymerization reaction can be removed by cooling (2-3 hrs). The polymerization reaction temperature should be maintained at 80°-84° C. by cooling as necessary. When the additions are completed, the monomer mixture and catalyst containers and feed lines are rinsed to the kettle with water. The batch is cooled to ambient temperature for storage, or maintained at an appropriate temperature for reaction with the insoluble transition metal compound. The resulting polymer has a calculated $T_g$ of 43° C., and a Minimum Filming Temperature (MFT) of 49° C.

MINIMUM FILM FORMING TEMPERATURE

The method of determining minimum film forming temperature (MFT) makes use of a Minimum Film Forming Temperature Bar, a horizontal, rectangular plate or table which has temperature-measuring thermocouples spaced at regular intervals along its length. By means of heating units located within the table and a reservoir at one end which can be charged with a dry ice/acetone bath, a temperature gradient of 0° to 100° C. is maintained along the bar. Longitudinal grooves approximately 1/32-inch deep run the length of the bar and span the complete temperature range. A sample of the polish to be tested is pipeted into one of the grooves, spread along it with the tip of the pipet and allowed to dry. The temperature of the bar at the point where the polish residue changes from a noncontinuous to a continuous film is noted as the MFT.

EXAMPLE 1

All Acrylic Floor Polish Polymer-Demonstration Of Reaction

A 100 g. sample of uncrosslinked polymer prepared according to the above procedure, with a composition of 28 BA/62 MMA/10 MAA (43° C. $T_g$, 49° C. MFT, 43.6% total solids), was heated to 50° C. and 0.62 g. of ZnO (7.60 millimoles; 30% of theoretical stoichiometry based on polymer acid functionally) which had been mixed into 15 g of water, was added to the polymer emulsion in five portions of 3 cc each. Each portion clouded the mix, but the cloudiness disappeared within 5 minutes. The emulsion product remained free of sediment and had an MFT of 60°-62° C.

The appearance and disappearance of cloudiness after each charge, coupled with the observed increase in MFT of the polymer at the end of the procedure and the absence of sediment indicate that the polymer has reacted with the zinc oxide, yet the polymer retains the ability to form a film when properly formulated.

EXAMPLE 2

Higher Reaction Temperature

The procedure of Example 1 was repeated at 67° C. The disappearance of cloudiness occurred more rapidly after the addition of each portion indicating a more rapid rate of reaction. The emulsion product remained free of sediment, and had an MFT of 58°-60° C.

EXAMPLE 3

Reaction with 40% of Theoretical Stoichiometry of Zinc Oxide Based On Polymer Acid Functionality The procedure of Example 1 was repeated except that the reaction temperature was 70° C. and the amount of ZnO was 0.83 grams (10.14 millimoles; 40% of the theoretical stoichiometry). The mixture clouded after addition of each portion of zinc oxide and returned to initial appearance in about 1 minute indicating completion of the reaction and the system remained free of sediment. The emulsion product had an MFT of 69°-71° C.

Comparative A—Below $T_g$ of Polymer, No Observed Reaction

To 100 g. of uncrosslinked polymer emulsion with a composition of 62MMA/28BA/10MAA ($T_g$ of 43° C., MFT of 49° C., 43.6% total solids) was added 1.69 g. of a 49.8% solids ZnO dispersion (10.14 millimoles; 40% of theoretical stoichiometry) and 15.24 g. of water. The mixture was stirred for 1 hour at ambient (22° C.) temperature. However, the increased opacity of the mixture did not abate, and after standing, heavy sediment developed. The filtered emulsion product had an MFT of 48°-50° C., which represents no change in MFT during the above procedure, indicating that no reaction had taken place.

Comparative B—Below $T_g$, No Observed Reaction at Lower Stoichiometry with Stabilized Emulsion to Reduce Sediment Comparative Experiment A was repeated at 35% of theoretical Zn stoichiometry and without heating. Before addition of the ZnO dispersion, the emulsion pH was adjusted to 7.5 with a 10% aqueous solution of KOH to stabilize the emulsion and to test whether the heavy sediment noted in Comparative A was due to polymer precipitation. After stirring for 16 hours at room temperature (22° C.), the mixture opacity did not abate, and after standing, sediment developed. The filtered polymer emulsion had an MFT of 48°-50° C., which represents no change in MFT during the above procedure, indicating that no reaction had taken place.

Comparative C—Below $T_g$, No Observed Reaction at 30% Stoichiometry

Comparative Experiment B was repeated with ZnO charged at 30% of theoretical stoichiometry, and sediment again developed. The filtered emulsion product had an MFT of 48°-50° C., indicating that no reaction had taken place. Analysis of the sediment from this reaction showed it to be Zinc Oxide.

Comparative D—Zinc/amine Complex, Formulated at 50% Stoichiometry Produces Sediment A 100 gram sample of the polymer described in Example 1 was formulated with 50% of the theoretical stoichiometry of a zinc/amine complex prepared as described in U.S. Pat. Nos. 3,308,078 and 4,017,662: 50.3 grams of Zinc Oxide was reacted with 62.7 grams of Ammonium BiCarbonate and 83.4 grams of 28% Ammonium Hydroxide and diluted with 285 grams of DI water to form a 1.28 molal solution of Tetra-ammino Zinc BiCarbonate (8.39% Zinc as metal). 9.89 grams of this solution (12.7 millimoles of Zinc) was added over 30 minutes to the rapidly stirring emulsion, maintained at 22° C. After stirring for 6 hours, the mixture was allowed to stand for 16 hours and sediment was observed. This indicates that a mixture of 50% stoichiometric amount of zinc/amine complex based on polymer acid functionality did not form a shelf stable formulation with this polymer.

EXAMPLE 4

Reaction demonstrated at 50% of Theoretical ZnO Stoichiometry

The experiment of Example 1 was followed except that the emulsion polymer was maintained at 77° C., and the amount of ZnO was 50% of the theoretical stoichiometry based on polymer acid functionality (1.03 grams, 12.67 millimoles). All of the zinc oxide powder was added in one shot to the rapidly stirring polymer emulsion. The cloudy reaction mixture returned to a translucent blue appearance in several minutes and the system remained free of sediment. The resulting emulsion product had an MFT of 74°–76° C., indicating that a reaction has occurred.

Comparative E—Below $T_g$, No Observed Reaction at 50% Theoretical ZnO Stoichiometry The experiment of Example 4 was repeated at 38° C. (below the emulsion polymer Tg of 43° C.) with 50% of the theoretical stochiometry of ZnO (1.03 grams, 12.67 millimoles). The chalky appearance of the reaction mixture persisted during an hour of stirring at 38° C. and throughout 16 hours more of stirring at room temperature (22° C.). After several hours of standing, a fine white silt settled to the bottom of the reaction mixture. A filtered aliquot of the emulsion product had an MFT of 48°–50° C., indicating that reaction had not taken place.

EXAMPLE 5

Heating Unreacted Mixture Above $T_g$ Produces Reaction

The product of Comparative Example E (with sediment) was reheated to 77° C. with stirring. The chalky appearance of the reaction mixture disappeared rapidly. After cooling and standing quiescent for one day, there was no sediment. The emulsion product had an MFT of 74°–76° C. indicating that the reaction occurred.

EXAMPLE 6

Reaction Demonstrated at 60% Theoretical ZnO Stoichiometry

The experiment of Example 4 was repeated with 1.24 grams of ZnO (15.21 millimoles; 60% of theoretical stoichiometry), with similar results. The sediment-free emulsion product had an MFT of 79°–81° C.

EXAMPLE 7

Reaction Demonstrated at 70% Theoretical ZnO Stoichiometry

The experiment of Example 4 was repeated with 1.44 grams of ZnO (17.74 millimoles; 70% of theoretical stoichiometry), with similar results. The sediment-free emulsion product had and MFT of 84°–86° C.

EXAMPLE 8

Reaction Demonstrated at 80% Theoretical ZnO Stoichiometry

The experiment of Example 4 was repeated with 1.65 grams of ZnO (20.28 millimoles; 80% of theoretical stoichiometry), with similar results. The sediment-free emulsion product had an MFT of 88°–90° C.

EXAMPLE 9

Reaction Demonstrated at 90% Theoretical ZnO Stoichiometry

The experiment of Example 4 was repeated with 1.86 grams of ZnO (22.81 millimoles; 90% theoretical stoichiometry), with similar results. The sediment-free emulsion product had an MFT of 91°–94° C.

EXAMPLE 10

Reaction Demonstrated at 100% Theoretical ZnO Stoichiometry

The experiment of Example 4 was repeated with 2.06 grams of ZnO (25.35 millimoles; 100% of theoretical stoichiometry). The reaction time, as indicated by the time for development of reduced opacity in the reaction mixture, was more prolonged, and a slight sediment formed on standing. The MFT of the filtered emulsion product was 96°–99° C. which demonstrates that reaction occurred to a greater extent than at the 90% stoichiometry of Example 9.

EXAMPLE 11

Reaction Demonstrated at 120% Theoretical ZnO Stoichiometry

The experiment of Example 4 was repeated with 2.48 grams of ZnO (30.42 millimoles; 120% of theoretical stoichiometry). In this case, the opacity of the white reaction mixture did not decrease, and a significant amount of a fine white silt rapidly formed upon standing. The sediment was isolated, washed, analyzed and found to be unreacted ZnO. The filtered emulsion product had an MFT of 96°–99° C., indicating that the extent of polymer reaction (presumed to be 100% of stoichiometry) with the ZnO was identical in this experiment with that of Example 10.

EXAMPLE 12

Floor Polish Vehicle Comparison

A sediment-free sample of emulsion polymer reacted with zinc oxide dispersion to 30% stoichiometry was prepared (product of Example 1). The pH of this product was adjusted from 6.3 to 7.4 with ammonia, and the emulsion was diluted to 38% total solids with deionized water. The MFT of this emulsion product, Example 12, was 59°–62° C.

Comparative F

An aliquot of the same uncrosslinked starting emulsion as in the above example was crosslinked with 5.99 grams of an 8.3% solution of $(NH_3)_4Zn(HCO_3)_2$ (the metal salt complex, latent crosslink of the prior art) measured as zinc metal (7.60 millimoles; 30% of theoretical stoichiometry). The crosslinked emulsion was diluted to 38% total solids with deionized water. The MFT of this emulsion product, Comparative F, was 60°–62° C.

Floor polishes were prepared from the product of Example 12 and Comparative F according to the same basic formulation.

| FORMULATION | | |
|---|---|---|
| Materials | Parts | Parts |
| Polymer F | — | 55.92 |

FORMULATION -continued

| | Parts | Parts |
|---|---|---|
| Polymer 12 | 55.92 | — |
| Water | 34.71 | 34.71 |
| Abex ® 18S (35%)[1] | 1.40 | 1.40 |
| FC-129 (1%)[2] | 1.00 | 1.00 |
| SWS-211[3] | 0.02 | 0.02 |
| Diethylene glycol monomethyl ether | 3.30 | 3.30 |
| Dipropylene glycol methyl ether | 5.00 | 5.00 |
| Tributoxy ethyl phosphate | 1.70 | 1.70 |
| Dibutyl Phthalate | 1.70 | 1.70 |
| Formalin (37%) | 0.15 | 0.15 |
| POLY-EM ® 40 (40%)[4] | 9.37 | 9.37 |
| Formulation Constants | | |
| Polymer/ASR/Wax ratio[5] | 85/0/15 | 85/0/15 |
| Theoretical non-volatile solids | 25.4% | 25.4% |
| pH | 7.2 | 8.5 |

[1] A product of Alcolac, Inc.
[2] A product of 3M Company
[3] A product of Wacker Silicone Corporation
[4] A product of Rohm and Haas Company
[5] ASR = Alkali soluble resin The two polishes were applied to vinyl floor tiles' and vinyl composite floor tiles and tested according to the indicated test procedures. In the tables below "vinyl" indicates a test applied to solid vinyl tile and "VCT" indicates a test applied to vinyl composition tile. The following comparisons were noted:

In the tables the following abbreviations have the meanings indicated: G=good, VG=very good; Ex or Exc=Excellent; a hyphenated rating such as G-VG indicates the performance was rated as between the two scores.

| | Polish Basis Polymer | |
|---|---|---|
| | Example 12 | Comparative F |
| GLOSS (ASTM D 1455): | | |
| 1st coat vinyl | VG | G-VG |
| 2nd coat vinyl | VG-EX | VG-EX |
| 1st coat VCT | G | G |
| 2nd coat VCT | VG-EX | VG-EX |
| LEVELING (ASTM D 3153): | | |
| 1st coat vinyl | G-VG | G-VG |
| 2nd coat vinyl | VG | VG |
| WATER RESISTANCE (ASTM D 1793): | | |
| 1 hour vinyl/VCT | G-VG/VG | G-VG/VG |
| 24 hour vinyl/VCT | VG/VG-EX | VG/VG-EX |
| DETERGENT RESISTANCE (ASTM D 3207) 1/20 dilution of Forward ® in water): | | |
| 1 day (vinyl/VCT) | VG-EX/VG-EX | VG-EX/VG-EX |
| 7 day (vinyl/VCT) | EX/EX | EX/EX |
| REMOVABILITY (ASTM D 1792): 1/20 dilution of Forward ®, with 1% Ammonia) | | |
| 7 day vinyl/VCT | G/EX | G/EX |
| RECOATABILITY (ASTM 3153): | Exc* | Exc* |
| STRESS RECOATABILITY (modified ASTM 3153, with 20 minute recoat time): | | |
| REDISPERSION | Exc | Fair |
| DRAG | Exc | Fair |
| WHITENING | Exc | Fair |
| GHOSTING | Exc | Good |

*A combined rating for all parameters = Excellent

The above data demonstrate that the polymer emulsion of Example 12 matched the positive performance properties of latent metal salt crosslinking without the recoat problems shown by the data for Comparative F reported under Stress Recoatability.

The Stress Recoatability data provides a more rigorous test of recoatability than the standard ASTM test; a second coat of polish is applied after an interval of 20 minutes to examine the performance of the polish emulsion if a second coat were applied in less than the recommended one hour interval, as does occur when the user attempts to rapidly build up a multicoat finish. Under this more rigorous challenge the polish prepared from the polymer of Example 12 exhibited 'excellent' performance on all test parameters. In contrast, the Comparative F polish exhibited 'fair' performance on the redispersion, applicator drag and whitening tests and 'good' on the ghosting test. This translates into more difficult spreading (applicator drag) and a diminished appearance quality (whitening, redispersion and ghosting) for Comparative F polish.

EXAMPLE 13

Styrenated Floor Polish Vehicle

A polymer was prepared according to Procedure A above, from a monomer mixture of 52 parts methyl methacrylate/28 parts butyl acrylate/12 parts styrene/8 parts methacrylic acid (calculated $T_g$ of 48° C., and emperical MFT of 54°-55° C.).

To 100 g of the above uncrosslinked styrenated emulsion polymer (44.0% solids) at 65° C. was added 0.58 g (7.61 millimoles) of powdered ZnO (Kadox 515) and 14.42 g of $H_2O$. This corresponds to 35% of the theoretical stoichiometry of Zinc, based on the polymeric acid content. The white ZnO powder reacted slowly, and the sample was free of sediment. The emulsion polymer product had an MFT of 65°-66° C.

EXAMPLE 14

Dispersion of ZnO Increases Reaction Rate

The experiment of Example 13 was repeated, but instead of powdered ZnO, 1.17 grams (7.61 millimoles; 35% of theoretical stoichiometry) of a 49.8% ZnO solids dispersion (0.1% Tamol 731 dispersant and DI water) was employed. The mixture became white and opaque but returned to initial appearance rapidly with stirring and the product was free of sediment after standing. The emulsion polymer product had an MFT of 65°-67° C.

Comparative G

Styrenated Floor Polish with Metal Complex

The polymer emulsion of Example 13 was treated with 7.81 grams of a Zinc complex solution formed from 46.7 grams ZnO, 110 grams NH$_4$OH (28%), 68.7 grams NH$_4$HCO$_3$, 37.5 grams Dimethylamino ethanol, and diluted with water to 5.99% Zn (as a metal). The theoretical stoichiometry of the Zn was 35%, based on polymeric acid. The emulsion polymer product had an MFT of 63°-64° C.

The emulsion products of Example 14 and Comparative G were formulated and tested as floor polish vehicles.

| Formulation for Styrenated Acrylic Floor Polish | | |
|---|---|---|
| POLISH | Ex. 14 Parts | Comparative G Parts |
| Materials | | |
| Water | 37.78 | 37.78 |
| Acrysol ® 644 (42%)[1] | 5.96 | 5.96 |
| FC-120 (1%) | 0.75 | 0.75 |
| SWS-211 | 0.02 | 0.02 |
| Diethylene glycol monethyl ether | 6.67 | 6.67 |
| Tributoxethyl phosphate | 1.67 | 1.67 |
| Formalin (37%) | 0.15 | 0.15 |
| Polymer 14 | 46.88 | — |
| Comparative G | — | 46.88 |
| Poly-Em (40 (40%) | 9.30 | 9.30 |
| Formulation Constants | | |
| Polymer/ASR/Wax ratio | 75/10/15 | 75/10/15 |
| Theoretic non-volatile solids | 24.5% | 24.5% |
| pH | 7.4 | 8.9 |
| Viscosity (Brookfield LVT, ultra-low adapter, 60 rpm.) | 6.6 | 8.0 |

[1] A product of Rohm and Haas Company, neutralized to pH 7.5 with NH$_4$OH after addition.

| Test Results | Example 14 Metal Oxide | Comparative G Metal Complex |
|---|---|---|
| Gloss (v/vct) | VG-EXC/VG | VG-EXC/VG |
| Leveling | VG-EXC | VG-EXC |
| Recoatability | EXC | G-VG |
| Water resist | VG | VG |
| Detergent resist | EXC | G-VG |
| Removability | GOOD | GOOD |
| Stress Recoatability | | |
| Redispersion | EXC | GOOD |
| Drag | EXC | GOOD |
| Whitening | EXC | GOOD |
| Ghosting | EXC | GOOD |

The polymer of Example 14 exhibited better stress recoat performance than Comparative G.

EXAMPLE 15

A styrenated acrylic emulsion polymer was prepared according to procedure A above, from a monomer mixture of 34 parts methyl methacrylate/28 parts butyl acrylate/25 parts styrene/5 parts acrylonitrile/8 parts methacrylic acid (calculated Tg of 47° C., and emperical MFT of 54°-55° C.).

This polymer was reacted with 95% of theoretical stoichiometry of Zinc oxide at 65° C. The reaction mixture turned opaque then returned to initial appearance and no sediment was observed. The emulsion polymer product had an MFT of 70° C.

After the emulsion pH was adjusted from 5.8 to 7.3 with ammonia (MFT of 68° C.), the polymer was formulated into a floor polish with good performance properties and excellent stress recoatability.

EXAMPLE 16

High Glass Transition Temperature Polymer

A polymer was prepared according to Procedure A from a monomer mixture of 59 parts styrene, 21 parts butyl acrylate and 20 parts methacrylic acid. The 40.6% solids emulsion, with a calculated T$_g$ of 62° C., had a pH of 5.1 and an MFT of 68°-70° C. The emulsion was heated to 70°-72° C. and charged with 10.66 grams (47.2 millimoles; 50% of theoretical stoichiometry based on polymeric acid) of a Zn(OH)$_2$ dispersion made from 44 grams of powdered Zinc Hydroxide in 56 grams of a 0.75% solution of Tamol 731 dispersant in water (28.95% Zn as metal). After about one hour, the reaction mixture was noted to have become less opaque and had returned to its original appearance. The reaction product was free of sediment and had an MFT of 96° C., and a pH of 6.2. All three of these properties are indications that a reaction had taken place between the polymer and the insoluble transition metal compound.

SEQUENTIALLY POLYMERIZED FLOOR POLISH VEHICLE

Procedure B

Monomer mixture preparation

Two monomer emulsion mixtures (M.E.#1 and M.E.#2) were prepared by adding the following monomers slowly and in sequence to a stirred solution of 6.3 parts of a 28% solution of Sodium Lauryl Sulfate in 858 parts of deionized water:

| | Monomer Emulsion | |
|---|---|---|
| Monomer | #1 Parts | #2 Parts |
| butyl acrylate | 537 | — |
| methyl methacrylate | 187.5 | 88.5 |
| hydroxyethyl methacrylate | 88.5 | — |
| styrene | — | 715.5 |
| methacrylic acid | 81 | — |
| acrylic acid | — | 88.5 |

Polymerization

In a suitable reaction vessel equipped with a thermometer, condensor, and stirrer, a solution of 51 parts of 28% SLS solution and 858 parts deionized water is heated to 80°-85° C. 51 parts of monomer emulsion #1 described above is added all at once to the reaction vessel and the temperature will drop to 80°-82° C. A kettle charge ammonium persulfate (APS) catalyst solution (8.4 parts dissolved in 48 parts water) is added all at once. Within about five minutes the onset of polymerization is signalled by a temperature rise of 3°-5° C. and a change in the appearance (color and opacity) of the reaction mixture. When the exotherm has ceased, the remaining monomer emulsion #1 and the cofeed catalyst solution (1.2 parts APS in 64.5 parts deionized water) are gradually added to the reaction vessel. The rate of addition must be chosen based on the rate at which the heat of the polymerization reaction can be removed by cooling (1-2 hrs). The polymerization reaction temperature should be maintained at 80°-88° C. by cooling as necessary. When the additions are completed, the monomer emulsion #1 and catalyst containers and feed lines are rinsed to the kettle with 30 parts water. The reaction mixture is held at 82°-86° C. for 15 minutes, and then the monomer emulsion #2 and the cofeed catalyst solution (1.2 parts APS in 64.5 parts deionized water) are gradually added to the reaction vessel. The rate of addition must be chosen based on the rate at which the heat of the polymerization reaction can be removed by cooling (1-2 hrs). The polymerization reaction temperature should be maintained at 80°-88° C. by cooling as necessary. When the additions are completed, the monomer emulsion #2 and catalyst containers and feed lines are rinsed to the kettle with 30 parts water. After holding the reaction mixture at 83°-88° C. for 15 minutes, a chase solution of 1.3 parts t-Butyl HydroPeroxide in 9 parts water is added in 10 minutes and then a second chase of 0.5 parts iso-Ascorbic Acid in 39 parts water is added over 15 minutes. During this latter addition, no external heating is applied to the vessel. The batch is cooled to ambient temperature for storage, or maintained at an appropriate temperature for reaction with the insoluble transition metal compound. The resulting polymer has an emperical $T_g$ of 10° C. (first sequential polymer), 110° C. (second sequential polymer), and an effective (overall) $T_g$ of 55° C. The 46.9% solids emulsion, with a composition of 30 BA/10.5 MMA/5 HEMA/4.5 MAA/40 Styrene/5 MMA/5 AA, has a Minimum Filming Temperature (MFT) of 32° C.

EXAMPLE 17

100 grams of uncrosslinked emulsion sequential polymer prepared according to the above procedure was heated to 60° C. and 1.39 grams of ZnO (17.13 millimoles; 60% of theoretical stochiometry, based on total polymeric acid functionality), dispersed in 10 grams of water, was added with stirring. After 20 minutes it was noted that the very chalky appearance of the reaction mixture had returned to the milky appearance of the initial emulsion. On cooling, and after standing over night it was noted that a soft, slightly gellatinous sediment had formed.

This sediment was analyzed and found to be identical in composition and polymer/Zinc ratio to the supernatant emulsion solids, and also identical to the theoretical composition and polymer/metal ratio of the reaction mixture. The reaction product emulsion, however, is apparently not stable, forming the sediment as a result of mechanical, chemical, or thermal shock encountered in the reaction process. The filtered emulsion had an MFT of 44° C., indicating that reaction with the metal salt has taken place.

EXAMPLE 18

The experiment of Example 17 was repeated, but before the ZnO dispersion was added the pH 4.8 polymer emulsion was partially neutralized with 10% Potassium Hydroxide solution to pH 6 in order to improve the mechanical and chemical stability of the emulsion. After reaction with the metal compound, the sediment-free emulsion had an MFT of 46°-48° C., and it was stable to freeze/thaw cycling (3 cycles, ASTM D 3209) and 3 minutes Waring Blender mechanical stability testing.

The reaction product emulsion pH was adjusted to 7.2 (MFT 44°-45° C.) with ammonia before formulating it as a floor polish.

EXAMPLE 19

The experiment of Example 17 was repeated, but before the ZnO dispersion was added the pH 4.8 polymer emulsion was partially neutralized with 5% Ammonium Hydroxide solution to pH 6. After reaction with the metal salt, the sediment-free emulsion had an MFT of 44°-47° C., and it was stable to freeze/thaw cycling (3 cycles, ASTM D 3209) and 3 minutes Waring Blender mechanical stability testing.

Comparative H

The uncrosslinked sequential polymer emulsion of Examples 17-19 was crosslinked to 60% stochiometry with a $(NH_3)_4 Zn(HCO_3)_2$ solution prepared by mixing 100 g. DI $H_2O$, 66 g $NH_4HCO_3$, 139 g. $NH_4OH(28\%)$, 59 g. ZnO. The metal complex solution, after clarifying, was diluted to 8.3% Zn (as metal) and 13.49 grams was slowly added to 100 grams of the stirring emulsion polymer at 30° C. No sediment or gel formed. The pH 9.2 product emulsion had an MFT of 42°-44° C., and was both mechanical and freeze/thaw stable.

Data for Example 18 and Comparative H polish formulations is presented.

| FORMULATION: | | |
|---|---|---|
| | Ex. 18 PARTS | Comp. H PARTS |
| MATERIAL IN ORDER OF ADDITION | | |
| Water | 52.64 | 52.64 |
| Acrysol 644 (42%) | 1.29 | 1.29 |
| FC-120 (1%) | 0.43 | 0.43 |
| SWS-211 | 0.014 | 0.014 |
| Dipropylene Glycol Methyl Ether | 4.40 | 4.40 |
| Tributoxy Ethyl Phosphate | 0.82 | 0.82 |
| Formalin (37%)* | 0.15 | 0.15 |
| Ex 17 Polymer | 38.84 | — |
| Comparative H Polymer | — | 38.80 |
| Poly-Em 40 (40%) | 3.38 | 3.38 |
| A-C 325N (35%) | 3.85 | 3.85 |
| FORMULATION CONSTANTS | | |
| Polymer/ASR/Wax Ratio | 82/3/15 | 82/3/15 |
| Theoretical Non-Volatile Solids | 17.8% | 17.8% |
| pH | 7.3 | 9.2 |

| | Example 18 | Comparative H |
|---|---|---|
| TEST RESULTS | | |
| Recoatability | EX | EX |
| Stress Recoatability | | |
| redispersion | Exc | Good |
| drag | Exc | Exc |
| whitening | Exc | Fair |
| Ghosting | Exc | Good |

All other polish performance properties were essentially equal.

Solubilized Low Molecular Weight Floor Polish

All of the previous examples have been with high ($\geq 2.5$ million) molecular weight polymers. The technology can also be applied to lower molecular weight acid-containing polymers, such as those prepared according to U.S. Pat. No. 4,017,662. These polymers are intended to be aqueous base solubilized, so if the stoichiometric level of the metal compound exceeds a certain point the polymer will be destabilized and will no longer be soluble in the alkaline aqueous medium (This point varies with the molecular weight and acid content of the polymer).

A polymer emulsion was prepared according to Procedure A above, from a monomer mixture of 52.5 MMA/ 29.5 BA/ 18 MAA, and with 1.5% by weight, based on total monomers, 3-Mercapto Propionic Acid (3-MPA) as a chain transfer agent. The resulting polymer, with a measured $T_g$ of 81° C. (Differential Scanning Colorimetry) molecular weight ($M_w$) of 32,700 and a number averaged molecular weight ($M_n$) of 13,500, with an intrinsic viscosity (THF at 30° C.) of 0.13. As prepared at pH 5.4, the 39% solids emulsion has an MFT of 84° C., but the polymer is solubilized (optical transmission ≧97% at 525 nm) when the pH is adjusted to greater than 6.7 with Ammonium Hydroxide solution. The MFT of the solubilized polymer, measured at pH 7.5, was found to be less than room temperature (22° C.).

EXAMPLE 20

A 100 gram aliquot of the un-neutralized 39% total solids polymer emulsion described above was reacted with 0.80 grams of a 49.4% $Zn(OH)_2$ dispersion (3.98 millimoles; 10% theoretical stoichiometry) at 85° C. The emulsion polymer product had an MFT of 90° C., and was solubilized (optical transmission of 95% at 525 nm) when the pH was adjusted to 7.4 with ammonia (MFT 30° C.). The solubilized polymer had an MFT of 26° C. at pH 7.8.

EXAMPLE 21

High Acid Copolymer

A polymer emulsion was prepared according to Procedure A, with a composition of 35 Ethyl Acrylate/65 Methacrylic Acid. It was necessary to increase the level of primary emulsifier (SLS) in both the monomer emulsion and the kettle charge to twice that of the polymer of Example 1 in order to limit the amount of aqueous phase initiated homopoly(methacrylic acid). The resulting polymer emulsion (calculated Tg of 80° C.), at 20.2% solids, had a pH of 3.5 and an MFT of 83°-85° C. When basified to pH 5.8 with a few drops of a 10% solution of Potassium BiCarbonate, the MFT dropped to 55°-60° C.

The above emulsion polymer as basified to pH 5.8, was reacted at 85° C. with a dispersion of ZnO prepared from 73.4 grams water, 1.6 grams Tamol 960 dispersant, and 25 grams ZnO (Kadox 515). A 9.84 grams sample of this ZnO dispersion (30.3 millimoles; 39.6% of theoretical stoichiometry) was added to 100 grams of the emulsion in one shot. The very chalky appearance of the reaction mixture was noted to rapidly revert to the translucent blue appearance of the original emulsion. No sediment formed, and the reaction product had an MFT greater than 100° C.

EXAMPLE 22

Use of Copper Demonstrated

To 100 grams of a sample of polymer prepared according to the procedure A above with a composition of 28 BA/62 MMA/10 MAA (43° C. $T_g$, 48° C. MFT, 43.6% total solids), was added 1.01 grams of black Cupric Oxide powder (12.66 millimoles; 50% of theoretical stoichiometry based on polymeric acid functionality). After reaction at 65° C., this sediment-free mixture yielded a lightly colored blue-green emulsion with an MFT of 75° C. The increasd MFT indicates that reaction with the polymer occured. This emulsion was basified to pH 7.2 with Potassium BiCarbonate and formulated into a polish that exhibited acceptable performance properties.

EXAMPLE 23

Use of Nickel Demonstrated

To 100 grams of a sample of polymer prepared according to the procedure A above with a composition of 28 BA/62 MMA/10 MAA (43° C. $T_g$, 49° C. MFT, 43.6% total solids), was added 1.17 grams of green Nickle Hydroxide ($Ni(OH)_2$) powder (12.65 millimoles; 50% of theoretical stochiometry based on polymeric acid functionality). After reaction at 65° C., this sediment-free mixture yielded a light pink emulsion with an MFT of 78°-80° C. The increasd MFT indicates that reaction with the polymer occured. This emulsion was basified to pH 7.2 with Potassium BiCarbonate and formulated into a polish that exhibited acceptable performance properties.

EXAMPLE 24

Industrial Coatings Vehicle

A polymer was prepared according to procedure A above, having a composition of 38.3 Hexyl methacrylate, 30.1 Styrene, 24.7 Acrylonitrile 6.9 Methacrylic Acid ($T_g = 58$° C.) and placed in a reaction vessel. An aqueous mixture containing 0.98 g ZnO (12.04 millimoles; 30% stoichiometric equivalent based on Zn as metal), and 1.66 g $K_2CO_3$ (12 milliequivalents) was added. The temperature of the reaction vessel was 65° C. After the reaction 1.35 g KOH (24 millimoles) were added. The reaction product was formulated into standard 15 PVC white enamel and applied to a steel substrate and baked. The resulting film exhibited improved performance versus a film containing the same polymer without crosslinking, and versus a film of uncrosslinked polymer having a $T_g$ of 60° C., when tested for early print and block resistance, solvent resistance (MEK rub), direct and reverse impact hardness. This demonstrates that the products of the invention are useful in industrial coatings on metals and other substrates such as plastic and wood.

We claim:

1. A composition comprising the product of the reaction in an aqueous system of:
   (a) the pendant acid functionality of a polymer prepared from more than one ethylenically unsaturated monomer, including from about 4 to about 90 weight percent of acid-functional monomer(s), said polymer having a calculated $T_g$ of from greater than about room temperature to less than the decomposition temperature of the polymer, with
   (b) a transition metal compound, at a temperature about the calculated $T_g$ of said polymer and below the decomposition temperature of said polymer; for a time sufficient to produce a degree of reaction of said acid and metal indicated by the product having a minimum filming temperature above that of said polymer prior to the reaction; and wherein said reaction product is capable of forming a film.

2. The composition of claim 1, wherein the transition metal is selected from the group consisting of zinc, aluminum, tin,. tungsten and zirconium.

3. The composition of claim 1, wherein the transition metal compound is an oxide, hydroxide carbonate or acetate.

4. The composition of claim 1, wherein the amount of transition metal compound is from about 10 to about 100 percent of the stoichiometric amount based on polymer acid functionality.

5. The composition of claim 1 further comprising pigments, fillers wetting, emulsifying and dispersing agents.

6. A floor polish composition comprising:
(a) the composition of claim 1;
(b) an alkali-soluble resin;
(c) a wax;
(d) a wetting agent;
(e) an emulsifying agent;
(f) a dispersing agent; and
(g) water in an amount to make the total solids of the composition from about 2 to about 55 percent.

7. The composition of claim 1, wherein the polymer is an aqueous emulsion or dispersion and the transition metal compound is insoluble in water.

* * * * *